US008832670B2

(12) United States Patent
 Fukatsu (10) Patent No.: US 8,832,670 B2
(45) Date of Patent: Sep. 9, 2014

(54) PROGRAMMABLE CONTROLLER AND PROGRAMMING TOOL FOR COMMUNICATION WITH LEGACY EQUIPMENT

(75) Inventor: Noriyasu Fukatsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 310 days.

(21) Appl. No.: 13/175,106

(22) Filed: Jul. 1, 2011

(65) Prior Publication Data

US 2013/0006397 A1 Jan. 3, 2013

(51) Int. Cl.
 *G06F 9/45* (2006.01)
 *H04L 12/28* (2006.01)
 *G05B 19/042* (2006.01)

(52) U.S. Cl.
 CPC .... *G05B 19/042* (2013.01); *G05B 2219/23334* (2013.01); *H04L 12/28* (2013.01)
 USPC .............. 717/144; 717/140; 717/146; 700/86

(58) Field of Classification Search
 USPC ............ 717/100, 131–156, 171–176; 712/43, 712/211–248; 700/18–118
 See application file for complete search history.

(56) References Cited

U.S. PATENT DOCUMENTS

| | | | | |
|---|---|---|---|---|
| 3,827,030 A | * | 7/1974 | Seipp | 712/223 |
| 3,878,514 A | * | 4/1975 | Faber | 712/200 |
| 4,443,865 A | * | 4/1984 | Schultz et al. | 712/242 |
| 4,802,116 A | * | 1/1989 | Ward et al. | 703/23 |
| 4,879,678 A | * | 11/1989 | Kurokawa et al. | 712/211 |
| 5,287,511 A | * | 2/1994 | Robinson et al. | 717/106 |
| 5,406,473 A | * | 4/1995 | Yoshikura et al. | 700/20 |
| 5,950,006 A | * | 9/1999 | Crater et al. | 717/140 |
| 6,088,624 A | * | 7/2000 | Khan et al. | 700/86 |
| 6,192,282 B1 | * | 2/2001 | Smith et al. | 700/19 |
| 6,826,432 B2 | * | 11/2004 | Beck et al. | 700/18 |

FOREIGN PATENT DOCUMENTS

| | | |
|---|---|---|
| JP | 5-334096 A | 12/1993 |
| JP | 2005-141435 A | 6/2005 |
| JP | 2006-141435 A | 6/2006 |
| JP | 2009-146229 A | 7/2009 |

OTHER PUBLICATIONS

François Jammes and Harm Smit, Service-Oriented Paradigms in Industrial Automation, IEEE Transactions on Industrial Informatics, vol. 1, No. 1, Feb. 2005, pp. 62-70.*

(Continued)

*Primary Examiner* — Satish Rampuria
(74) *Attorney, Agent, or Firm* — Sughrue Mion, PLLC; Richard C. Turner (57) ABSTRACT

A method of generating a symbol table for a programmable logic controller which executes high-level language program is provided. The method includes reading the high-level language program and an association table specifying relationship between devices controlled by the programmable logic controller and variable names in the high-level language program; compiling and linking the high-level language program and the association table for determining a physical address for each of the variable names and the corresponding devices; generating the symbol table by the compiling and linking, the symbol table defining the determined physical address for each of the devices; and storing the symbol table in the memory of the programmable logic controller. A programmable logic controller executing the high-level language program and storing the symbol table is also provided.

7 Claims, 8 Drawing Sheets

(56) References Cited

OTHER PUBLICATIONS

Vladimír Marík, Duncan McFarlane, Industrial Adoption of Agent-Based Technologies, 2005 IEEE, pp. 27-35.*

Vladimír Mařík, Pavel Vrba, Ken H. Hall, Francisco P. Maturana, Rockwell Automation Agents for Manufacturing, 2005 ACM, pp. 107-113.*

Office Action issued in Japanese Patent Application No. 2012-510458, mailed May 8, 2012.

* cited by examiner

PROGRAMMABLE CONTROLLER AND PROGRAMMING TOOL FOR COMMUNICATION WITH LEGACY EQUIPMENT

BACKGROUND

1. Field of the Invention

Apparatuses and methods consistent with the present invention relate to a programmable logic controller and its programming tool in an industrial automation environment. In particular, they relate to a programmable logic controller which can execute high-level language programs and easily communicate with legacy equipment.

2. Description of the Related Art

In modern manufacturing facilities, automated processes are often controlled by low-level automation and process control and monitoring systems. Low-level automation systems may include dedicated robotic devices or other automated systems controlled or monitored by programmable logic controllers (PLCs). Various sensing devices and instrumentation may be used to monitor such processes, such as machine vision systems, barcode readers, temperature sensors, etc.

Figure 1:
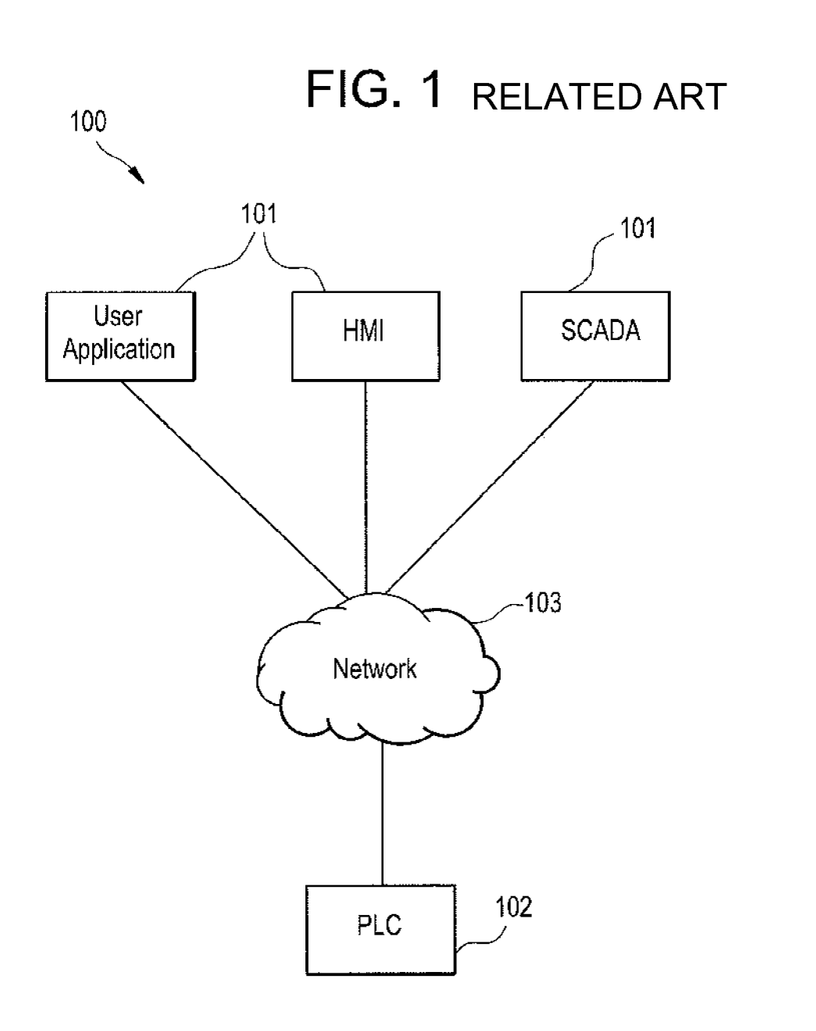
FIG. 1 illustrates a conventional industrial automation environment or production system.

FIG. 1 illustrates a conventional industrial automation environment or production system 100. Peripheral equipments 101 are connected to a PLC 102 through a network 103. The PLC 102 executes a ladder program to control various devices. An administrator may access a state of execution or a result of the various devices by querying the PLC through the peripheral equipments. Examples of the peripheral equipment include SCADA (Supervisory Control and Data Acquisition) systems, Human machine interface (HMI) systems, a user application running on a computer, etc. The PLC is coupled with a power module and a network module, which communicates the PLC information to the peripheral equipment.

"Device" as used herein includes physical apparatuses attached to and controlled by the PLC. Sensors, switches, relays, etc. are some examples of the devices referred to in this disclosure. However, a "device" according to the present disclosure, is not limited to a physical apparatus. A device can also refer to internal elements such as registers, internal relays, etc. which are assigned a memory address in the PLC. Further, a device may also refer to software elements that can communicate with the PLC via commonly accessible memory.

When the peripheral equipments query the PLC, the query states a device in the controller that the peripheral equipments want to monitor. For example, a query may be something like "is device X on/off."

Now, such queries may not be understood by a controller if the controller executes high-level language programs which do not recognize devices. A controller executing high-level language programs (such as a program written in C language) recognizes variable names and physical addresses of the variable names in the controller's memory instead of device names. If such a controller, which executes high-level language programs is installed in an existing production system, existing peripheral equipments will not be able to communicate with the controller.

However, customers desire to use new controllers that can execute high-level language programs because high-level language programs are easy to use and maintain and programmers prefer to use high-level language programs over ladder programs. A potential but less than satisfactory solution to the problem would be to use expensive middleware between the controller and the peripheral equipment.

Accordingly, there exists a need for a system which can overcome the above problem of communication between older peripheral equipments and newer controllers.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems listed above.

An exemplary method of generating a symbol table for a programmable logic controller which executes high-level language programs is provided. The method includes reading the high-level language program and an association table specifying relationships between devices controlled by the programmable logic controller and variable names in the high-level language program; compiling and linking the high-level language program and the association table for determining a physical address for each of the variable names and the corresponding devices; generating the symbol table by the compiling and linking, the symbol table defining the determined physical address for each of the devices; and storing the symbol table in the memory of the programmable logic controller.

An exemplary programmable logic controller executing the high-level language program and storing the symbol table is also provided.

Further, an exemplary method of communication between a peripheral equipment and a programmable logic controller executing high-level language program is also provided. The method comprises receiving a request for reading or writing to a device controlled by the programmable logic controller, the request received from the peripheral equipment; reading a symbol table to determine a physical address in a memory of the programmable logic controller for the device; and reading from or writing to the determined physical address.

BRIEF DESCRIPTION OF THE DRAWINGS

The above and/or other aspects of the present invention will be made more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

An exemplary embodiment of the present disclosure solves the problem mentioned in the background section by providing an association table that maps each of the devices with their corresponding variable names. However, before a description of the exemplary embodiment is provided, an understanding of a process of compiling of a high-level application program is necessary.

Figure 2:
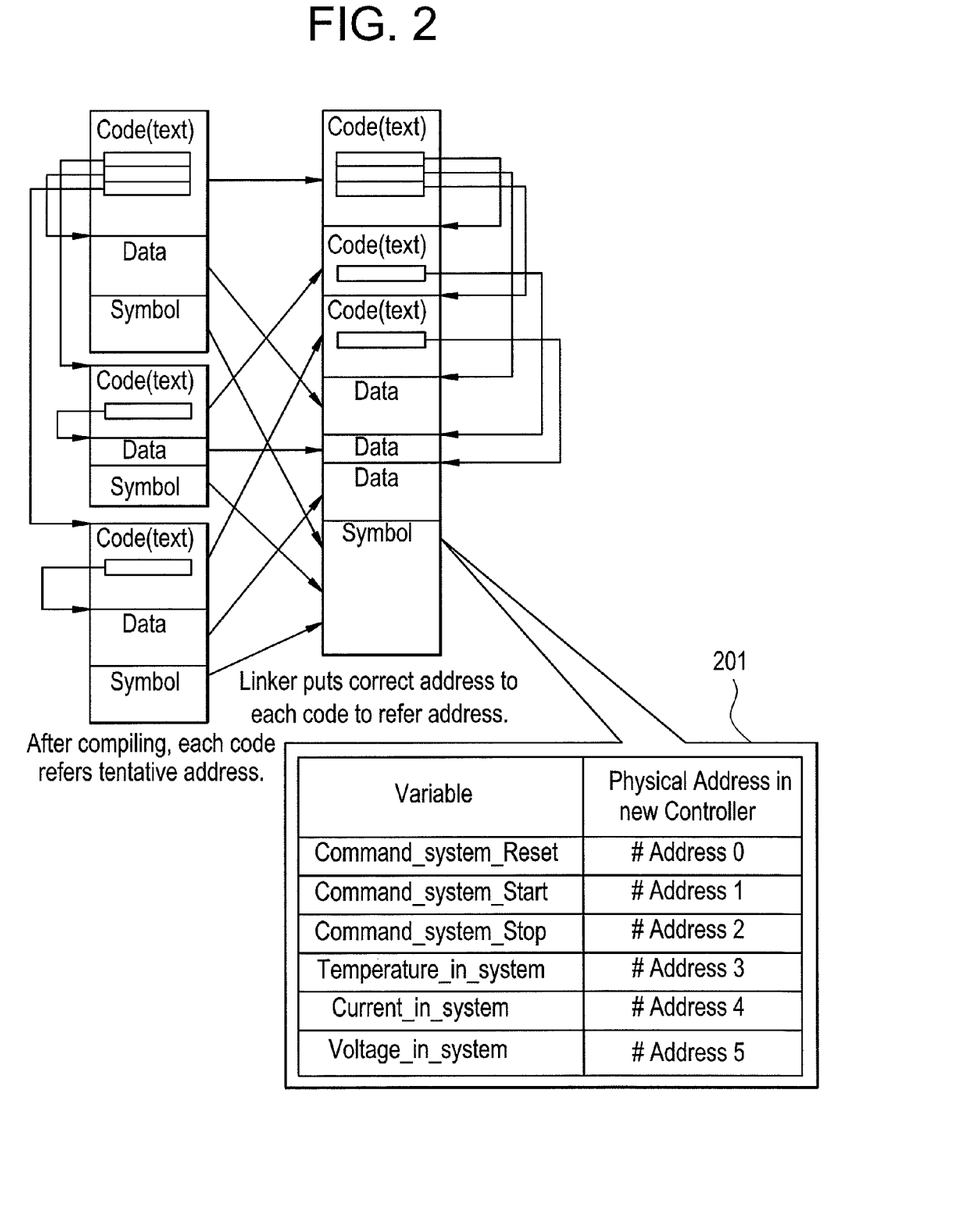
FIG. 2 illustrates compiling of three different programs and their organization in physical memory after compiling and linking according to a conventional method.

A compiler compiles a high-level language program (also referred to as a "high-level program") into an object module. That is, the compiler converts a high-level program source code into assembly code, which is understood by the underlying hardware (for example, a pipelined processor). A linker allocates physical addresses to each of the object files and variables declared in the high-level program. Further, the linker creates a symbol table which maps each of the variables to their respective physical addresses in the memory of the controller (a PLC is referred to herein as a controller). FIG. 2 illustrates compiling of three different programs and their organization in physical memory after compiling and linking. As seen from FIG. 2, the linker generates a symbol table 201 for mapping each of the variables to their respective physical addresses in the controller memory.

According to an exemplary embodiment of the present disclosure, an association table 301 is provided during compiling. The association table is provided by the developer or engineer developing the high-level program. The compiling and linking procedure is described in FIG. 3 and a difference between the conventional technique and the exemplary embodiment is the presence of the association table 301 during compiling. A symbol table 302 is generated as a result of the compiling and linking procedure. As seen from FIG. 3, this symbol table 302 includes a correspondence between device names, variables (declared in the high-level program), and physical addresses in memory.

Figure 3:
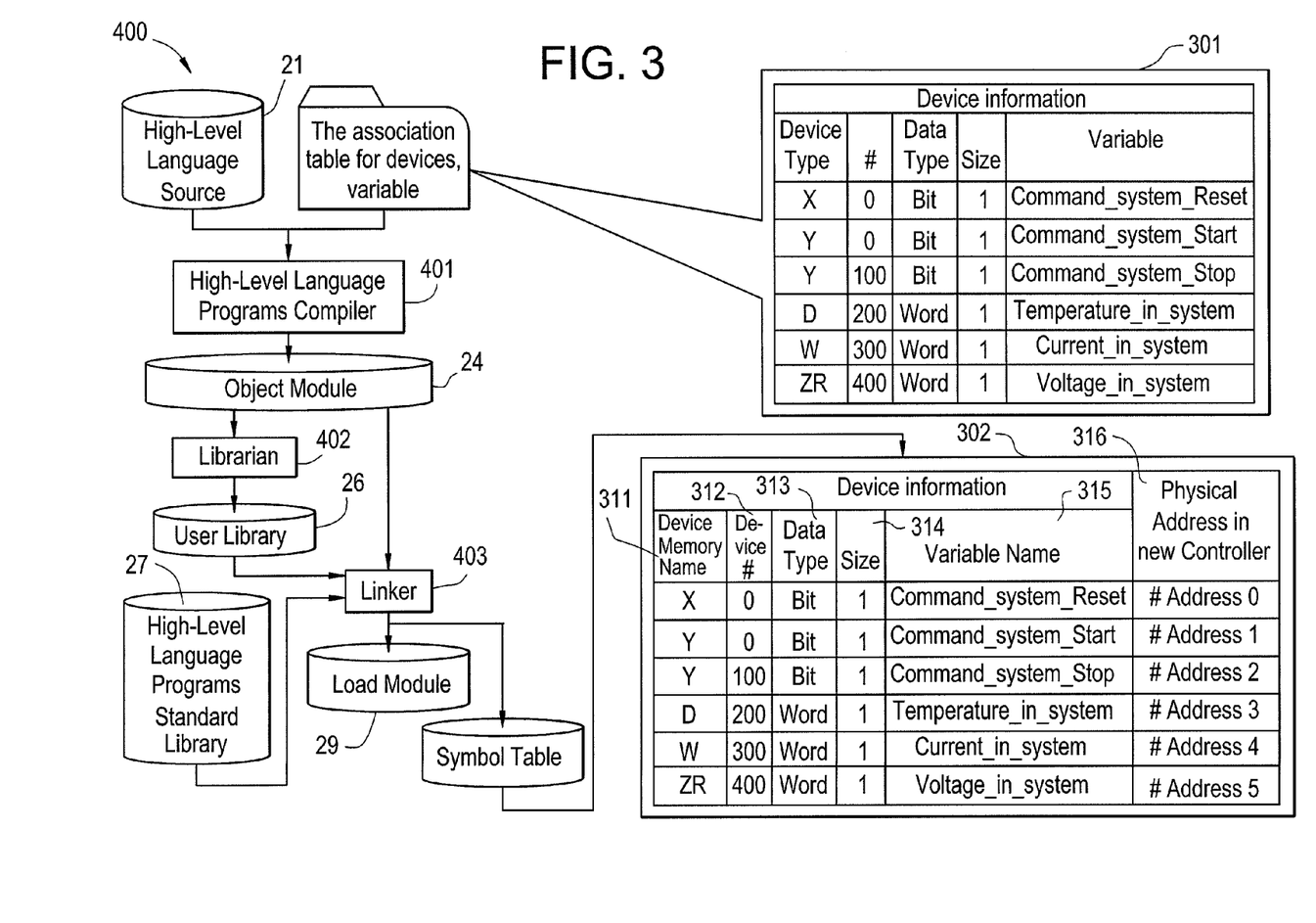
FIG. 3 illustrates compiling of three different programs and their organization in physical memory after compiling and linking according to an exemplary embodiment.

The symbol table 302 includes columns 311, 312, 313, 314, 315, and 316. Column 311 specifies the device memory name, column 312 specifies the device number, column 313 specifies the data type or data unit, column 314 specifies the amount of information for the data type of column 313, and column 315 specifies the variable names associated with the devices. As seen from symbol table 302, device D200 (specifies temperature measured by a temperature sensor of the controller) is referred to by a variable "Temperature_in_system" in the high level program. Further, the variable "Temperature_in_system" has been assigned a certain physical address (#Address 3) in the controller memory as seen in Physical Address in New Controller 316.

Figure 4:
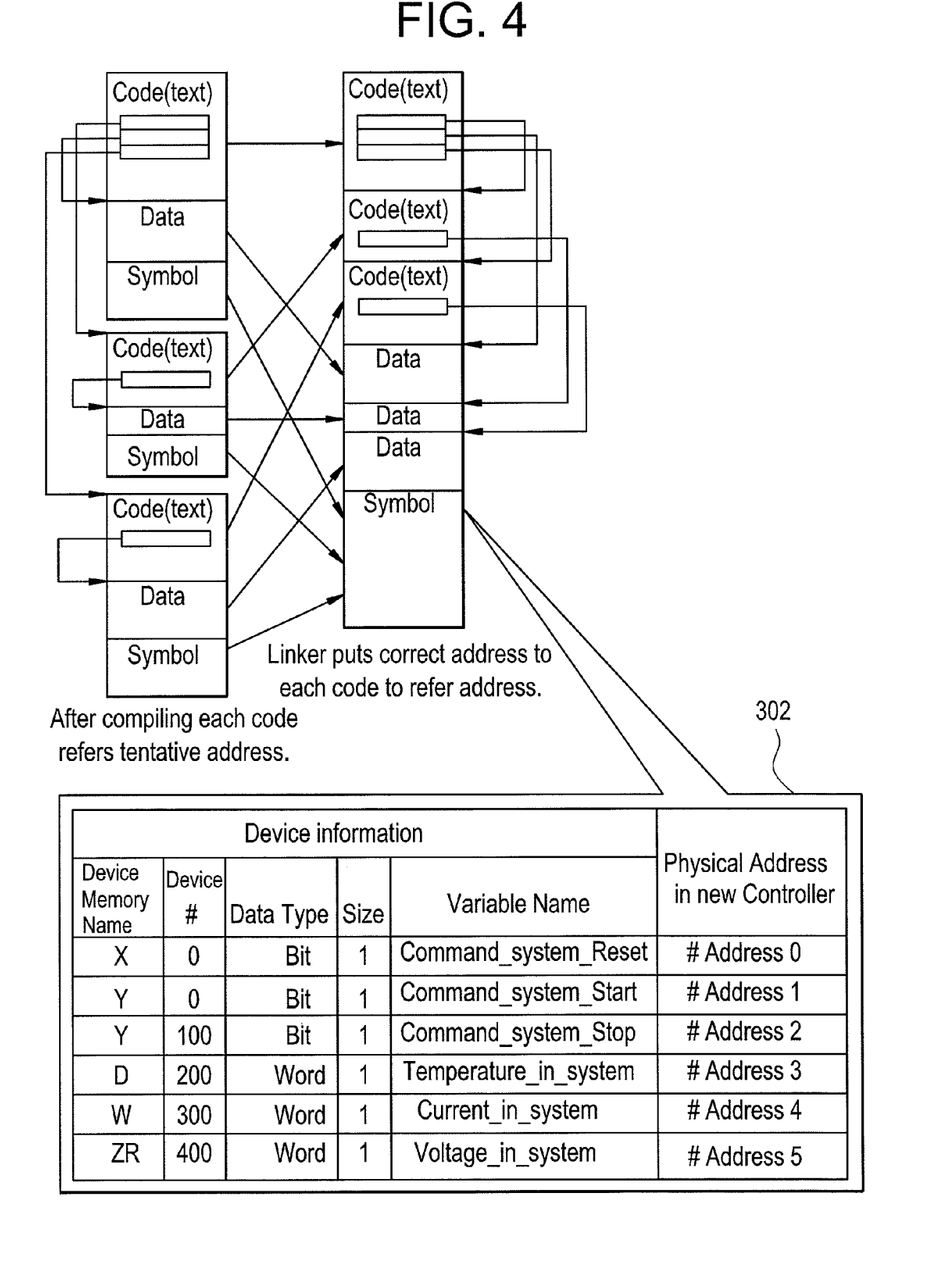
FIG. 4 illustrates a symbol table and memory organization of the controller according to an exemplary embodiment.

The symbol table 302 is stored in the controller's memory as shown in FIG. 4, which describes a memory organization of the controller post compiling and linking.

Figure 5:
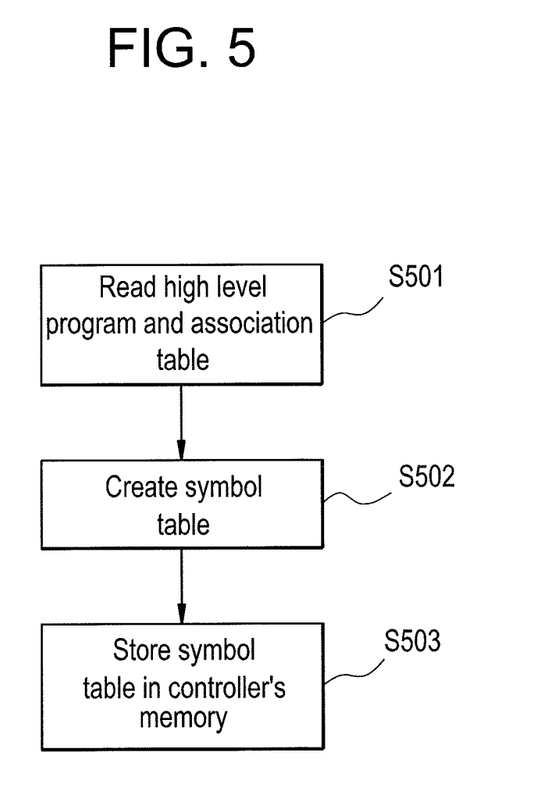
FIG. 5 illustrates an exemplary method of generating a symbol table.

FIG. 5 illustrates a method of creating a symbol table which stores a correspondence between device names, variable names, and physical addresses. In S501, a high-level program (s) and an association table (such as 301) is read by the compiler. The compiler creates assembly language files for each of the high-level program (s) and the association table. In S502, the linker assigns physical addresses to each of the variables declared in the high-level program (s) and creates the symbol table 302 by reading the association table and the compiled high-level program. In S503, the compiler stores the created symbol table 302 in the controller's memory.

It is possible to provide a high-level language processing tool (a programming tool 400) outside the controller 102 that compiles and links high-level language programs and creates the object files and symbol files. That is, the programming tool carries out the process illustrated in FIG. 5. The programming tool 400 may receive as input the association table 301 and the high-level programs and may output a symbol table 302, which is then downloaded to the controller. The programming tool compiles and links source programs, compiles and links the association table for devices and variable names, and creates the symbol table. That is, the programming tool 400 prepares an executable including the symbol table 302 and downloads the executable to the PLC.

A detailed description of the linking process performed by the programming tool 400 is now provided with reference to FIG. 3. The programming tool 400 includes a high-level language programs compiler 401 that compiles a high-level language source program 21 input to the programming tool 400. The high-level language source program 21 is a program written in a high level programming language. The high-level language program compiler 401 outputs an object module 24 (object file 24). The object file 24 corresponds to the high-level language source program 21. The object file 24 contains machine instruction codes compiled from source codes of the high-level language source program 21 and symbolic information representing variables used in the high-level language source program 21.

The programming tool 400 further includes a librarian 402, which integrates the object file 24 and other object files to create a user library 26. A linker 403 included in the programming tool 400 links the object file 24, user library 26, and a high-level language programs standard library 27 and creates a load module 29 and the symbol table 302. The high-level language programs standard library 27 contains machine instruction codes for frequently used subroutines. Mostly, the high-level language programs standard library 27 is provided by the provider of the high-level language programs compiler 401. However, a user can also prepare his or her own standard libraries as well. The symbol table 302 contains arrays or lists of definitions of relation among devices, variables and physical address of memory.

Figure 6:
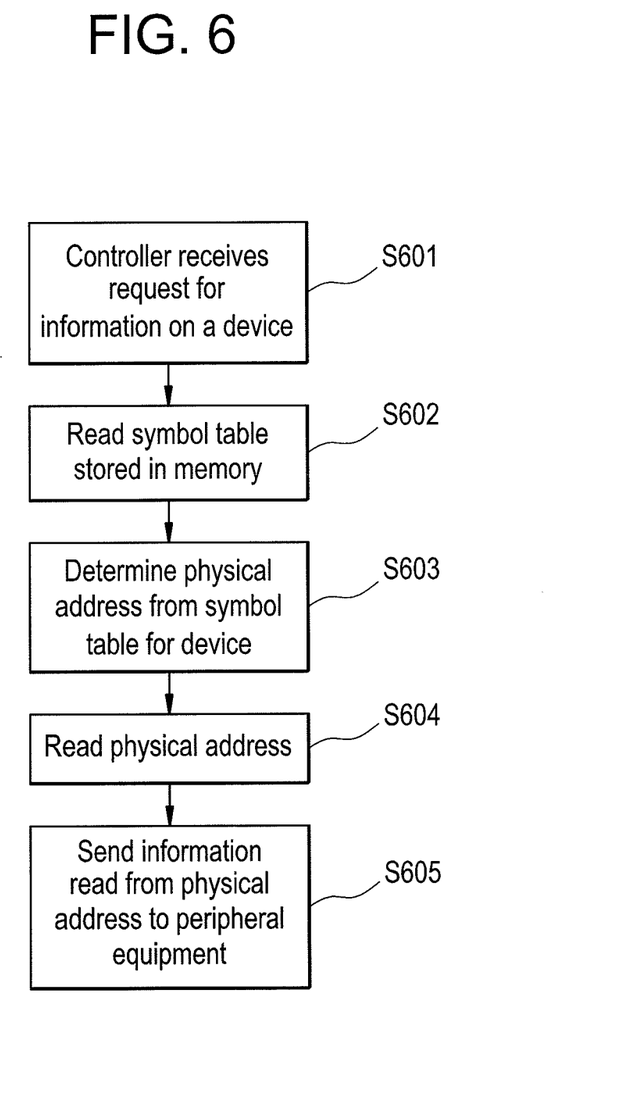
FIGS. 6 and 7 illustrate exemplary methods for handling a data read or write request to the controller from the peripheral equipments.

Next, a procedure is described for handling a data read request to the controller 102 from the peripheral equipments 101. In S601, a controller receives a request for information on a device included in the controller or controlled by the controller. The request may be a request for reading the status of a certain device. In S602, the controller reads the symbol table 302 from memory. In S603, the controller determines physical addresses for the device from the symbol table 302. In S604, the controller reads the data stored at the physical address in memory and sends the read information to the requesting peripheral equipment in S605.

A separate program may be stored in the controller that reads the symbol table and then reads the physical addresses from the controller's memory.

Figure 7:
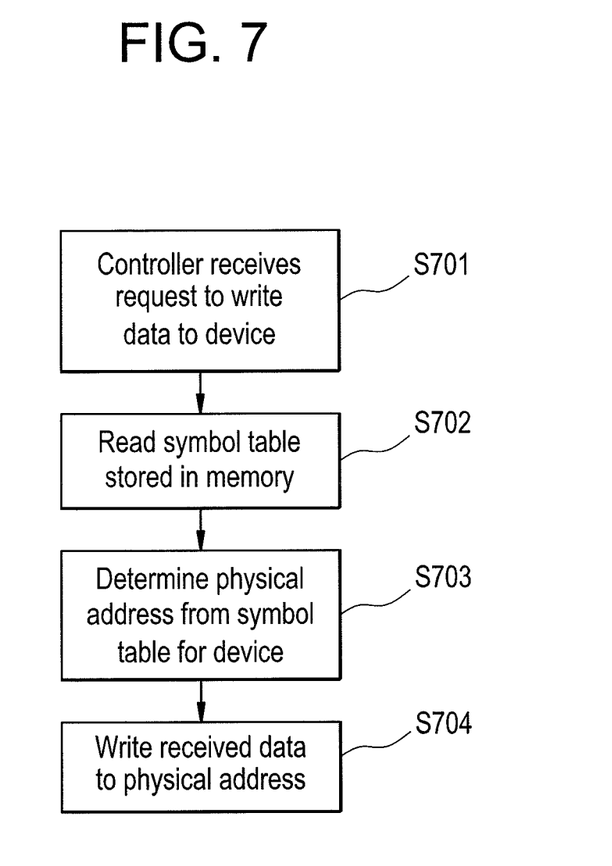

Next, a procedure is described for handling a data write request to the controller 102 from the peripheral equipments 101. In S701, a controller receives request for writing data to a device included in the controller or controlled by the controller. In S702, the controller reads the symbol table 302 from memory. In S703, the controller determines physical addresses for the device from the symbol table 302. In S704, the controller writes the data to the read physical location in memory.

Figure 8:
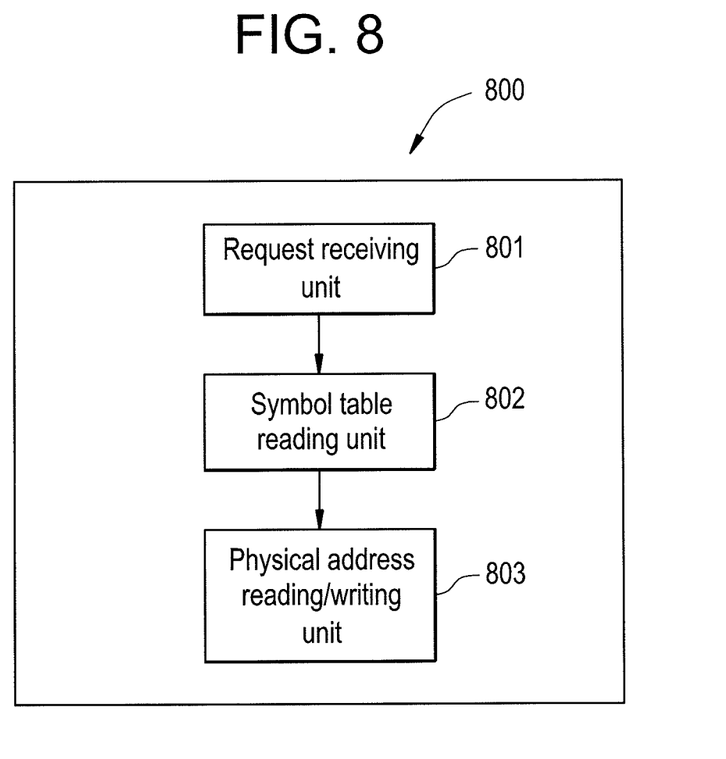
FIG. 8 illustrates an exemplary configuration for the controller.

FIG. 8 illustrates an exemplary configuration of a controller 800 (controller 102) which carries out the process of FIGS. 6 and 7. The controller 800 includes a request receiving unit 801 which receives a request from a peripheral equipment and determines the content of the request. A symbol table reading unit 802 reads the symbol table 302 stored in the controller's memory. A physical address reading/writing unit 803 reads/writes data to a memory location of the controller based on the symbol table 302 and the received request.

The controller's memory may be constituted from a non-exhaustive list of storage medium that would include the following: an electrical connection having one or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punch cards, paper tape, any other physical medium with patterns of holes, or any other medium from which a computer/controller can read or suitable combination of the foregoing.

Furthermore, each of the request receiving unit 801, symbol table reading unit 802, and physical address reading/writing unit 803 may be implemented using a processor.

The above-described exemplary embodiments provide a new controller which executes high-level programs and can also process requests for reading or writing to devices from peripheral equipments, which provide a device name in their request. The new controller reads the symbol table and converts device name into a physical address, which can be read from or written to. Thus, the new controller can handle requests of data access from peripheral equipment without the need of new middleware or updating of the peripheral equipments. The symbol table may be externally prepared by a programming tool and downloaded to the controller by the programming tool.

The programming tool 400 may include a processor such as an application-specific integrated circuit, a digital signal processor, etc., which performs the tasks of the high-level language programs compiler 401, the librarian 402, and the linker 403. Additionally, the programming tool 400 may include appropriate means for communicating with the PLC. For example, the programming tool 400 may communicate with the PLC through a universal serial bus (USB).

Furthermore, each of the processes described in FIGS. 5-7 may be implemented by a special purpose computer operating in accordance with instructions stored on a tangible computer-readable storage medium.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of generating a symbol table for a programmable logic controller which executes high-level language program and controls devices, the method comprising:
    reading a source code of the high-level language program and an association table wherein the association table defines a relationship between device names that are not supported by the high-level language program and variable names for the respective devices used in the high-level language program;
    compiling the source code of the high-level language program into assembly code to determine a physical address in a memory of the programmable logic controller for each of the variable names;
    generating the symbol table based on the association table and the physical address for each of the variable names determined by the compiling, the symbol table defining the determined physical address for each of the variable names and the names of the target device; and
    storing the symbol table in a memory of the programmable logic controller.

2. A method of communication between a peripheral equipment and a programmable logic controller executing high-level language program, and controlling devices, the method comprising:
    transmitting, by the peripheral equipment, a request for data read or data write related to a target device among devices controlled by the programmable logic controller, the request including a name of the target device that is not supported by the high-level language program;
    receiving, by the programmable logic controller, the request transmitted by the peripheral equipment;
    reading, by the programmable logic controller, a symbol table to determine a physical address in a memory of the programmable logic controller related to the target device;
    wherein the symbol table defines a physical address in the memory of the programmable logic controller for each of said name of said target device that is not supported by the high-level language program and
    reading from or writing to the determined physical address.

3. A programmable logic controller that executes high-level language program for controlling devices, the programmable logic controller comprising:
    a request receiving unit which receives a request for reading or writing related to a target device among devices controlled by the programmable logic controller, the request being transmitted by a peripheral equipment and including a name of the target device that is not supported by the high-level language program;
    a symbol table reading unit which reads a symbol table to determine a physical address in a memory of the programmable logic controller related to the target device, wherein the symbol table defines a physical address in the memory of the programmable logic controller for each of the name of the target device that is not supported by the high-level language program; and
    a physical address reading or writing unit which reads from or writes to the determined physical address,
    wherein the programmable logic controller comprises at least one hardware component.

4. The method of claim 2, wherein:
    the request includes the name of the target device, and
    the symbol table defines a relationship between a name of each of the devices, a variable name corresponding to the each of the devices and used in the high-level language program, and the physical address in the memory of the programmable logic controller corresponding to the variable name.

5. The programmable logic controller of claim 3, wherein:
the request includes the name of the target device, and
the symbol table defines a relationship between a name of each of the devices, a variable name corresponding to said each of the devices and used in the high-level language program, and the physical address in the memory of the programmable logic controller corresponding to the variable name.

6. The method according to claim 2, wherein the symbol table is generated by:
reading a source code of the high-level language program and an association table, wherein the association table defines a relationship between device names that are not supported by the high-level language program and variable names for the respective devices used in the high-level language program;
compiling the source code of the high-level language program into assembly code to determine a physical address in the memory of the programmable logic controller for each of the variable names; and
combining the association table and the physical address for each of the variable names determined by the compiling.

7. The programmable logic controller according to claim 3, wherein the symbol table is generated by:
reading a source code of the high-level language program and an association table, wherein the association table defines a relationship between device names that are not supported by the high-level language program and variable names for the respective devices used in the high-level language program;
compiling the source code of the high-level language program into assembly code to determine a physical address in the memory of the programmable logic controller for each of the variable names; and
combining the association table and the physical address for each of the variable names determined by the compiling.

* * * * *